United States Patent Office 3,032,974
Patented May 8, 1962

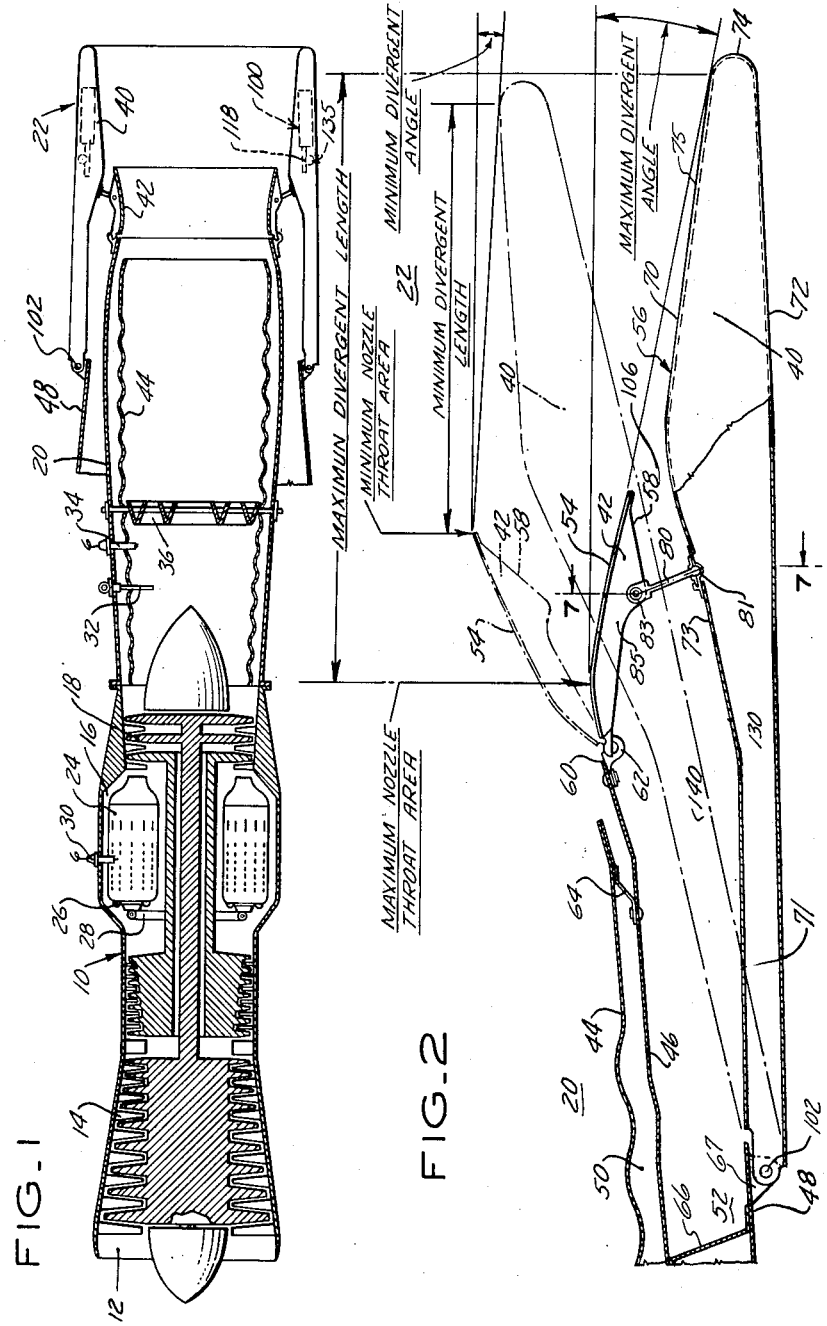

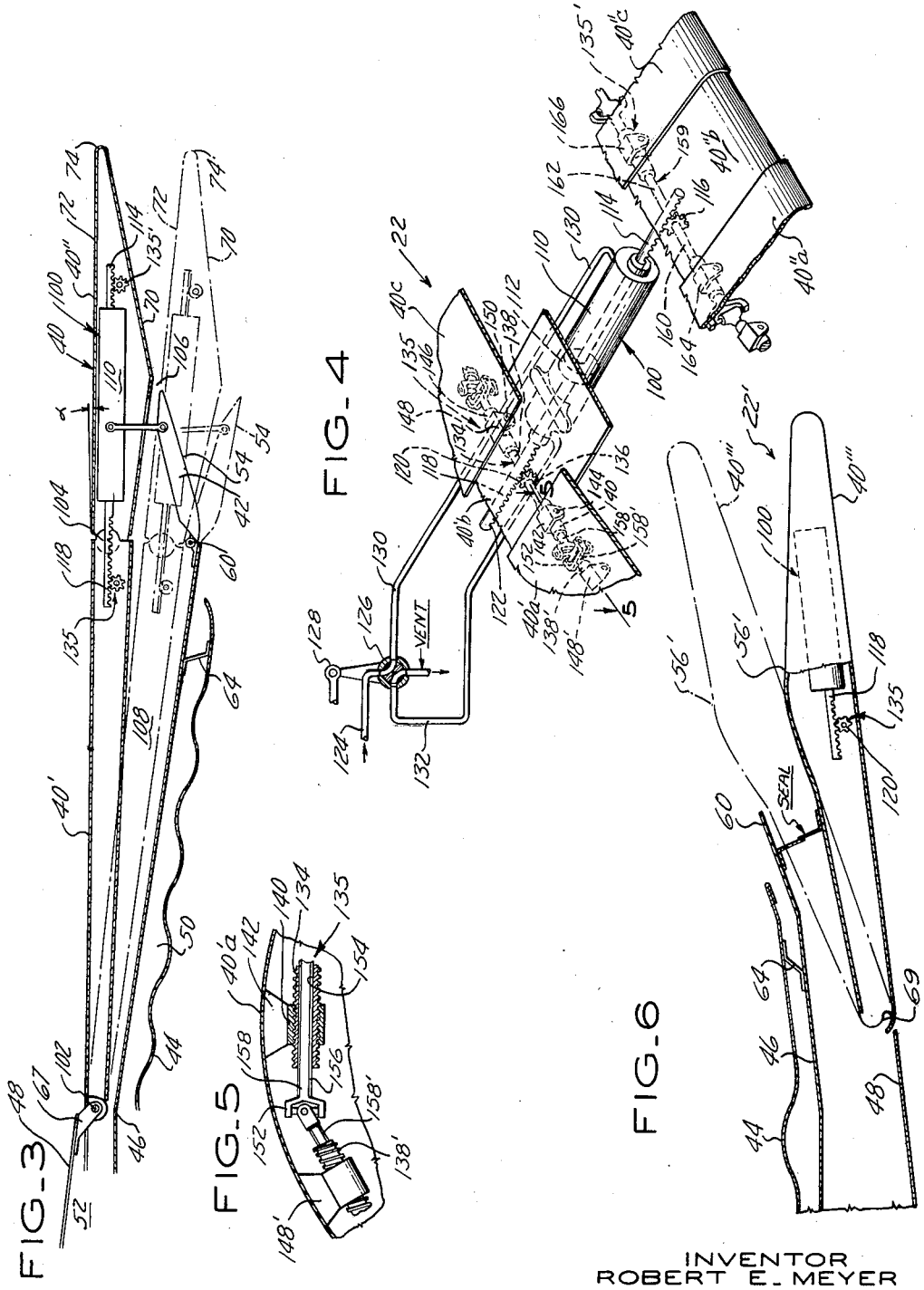

3,032,974
EXHAUST NOZZLE
Robert E. Meyer, Glastonbury, Conn., assignor to United
Aircraft Corporation, East Hartford, Conn., a corporation of Delaware
Filed Aug. 24, 1956, Ser. No. 606,122
4 Claims. (Cl. 60—35.6)

This invention relates to exhaust nozzles for use on engines such as aircraft turbo-jet engines and, more particularly, to variable area exhaust nozzles.

It is an object of this invention to provide an exhaust nozzle which may be positioned in an infinite number of intermediate positions between its full-open and full-closed positions.

It is a further object of this invention to provide a variable area exhaust nozzle which is convergent-divergent in all positions between and including full-open and full-closed positions.

It is a further object of this invention to provide an exhaust nozzle which has a plurality of outer flaps and a plurality of inner flaps, both of which may be fluid or air cooled.

It is a further object of this invention to provide an exhaust nozzle in which the gas loads imposed upon the exhaust nozzle flaps are taken in hoop tension by the flap actuating means.

It is a further object of this invention to provide a variable area convergent-divergent exhaust nozzle in which the nozzle throat area, the divergent nozzle angle, and the divergent nozzle length may be varied.

It is still a further object of this invention to provide an exhaust nozzle with good base drag characteristics.

It is still a further object of this invention to provide an exhaust nozzle in which the flap actuating mechanism is completely enveloped within a double-walled flap which forms an elongated annulus.

It is still a further object of this invention to provide a variable area convergent-divergent exhaust nozzle in which cooling air is introduced into the gas stream downstream of the primary nozzle throat.

It is still a further object of this invention to provide a double flap exhaust nozzle in which the outer flap is made of a forward part and an after part which is pivotally attached to the forward part to give greater nozzle position flexibility.

In the drawings:

FIG. 1 is a cross-sectional view of a typical aircraft turbo-jet engine with afterburner and with the double flap, variable area exhaust nozzle of the type to which this application relates attached to the afterburner.

FIG. 2 is an enlarged cross-sectional view of the double flap exhaust nozzle shown in FIG. 1 using a one-piece outer flap and depicted with the flaps in their inner position in phantom and their outer position in solid lines.

FIG. 3 is a cross-sectional view of the double flap exhaust nozzle taught in this application showing the approximate position of the submerged actuating system and showing a two-piece outer flap.

FIG. 4 is a schematic showing of the flap actuating system taught in this application.

FIG. 5 is a view along line 5—5 of FIG. 4.

FIG. 6 is a cross-sectional view of the actuating means taught in this application used with a single flap system.

Referring to FIG. 1 we see aircraft turbo-jet engine 10 comprising air inlet section 12, compressor section 14, combustion section 16, turbine section 18, afterburner section 20 and exhaust nozzle 22. Air enters air inlet section 12 and is compressed as it passes through compressor section 14 then is heated by combustion chambers 24 as it passes through combustion section 16. Fuel enters combustion chamber 24 through fuel nozzles 26 which are provided fuel by fuel manifold 28. Spark plug 30 or other ignition means may be used to ignite the atomized fuel which enters combustion chamber 24. After leaving combustion section 16, the heated gases pass through turbine section 18 and thence through afterburner 20. In afterburner section 20, fuel is introduced through fuel spray bar 32 and is ignited by spark plug or other ignition means 34 while flameholders 36 are provided so that combustion may be supported downstream thereof. After passing through and being reheated in afterburner section 20, the exhaust gases then pass through exhaust nozzle 22 and are discharged into the atmosphere so as to produce thrust. Exhaust nozzle 22 consists basically of a plurality of outer flaps 40 and a plurality of inner flaps 42 which are surrounded by outer flaps 40. Exhaust nozzle 22 is shown in somewhat greater detail in FIG. 2 which shows afterburner cooling liner 44 located within and concentric with afterburner duct 46. Engine nacelle or other duct 48 is located outboard of and concentric with afterburner duct 46 and afterburner cooling liner 44 such that cooling air passage 50 is formed between afterburner cooling liner 44 and afterburner duct 46 while cooling air passage 52 is formed between afterburner duct 46 and engine nacelle or other duct 48. The cooling air which passes through cooling air passages 50 and 52 may be provided from any convenient source, such as ram air, engine compressor air, or any bleed air from a relatively cool section of the engine. The cooling air or other fluid which passes through cooling passage 50 is discharged and flows over the inner surface 54 of inner flaps 42 of exhaust nozzle 22. The cooling air or other fluid which passes through the cooling fluid passage 52 passes between outer flaps 40 and inner flaps 42 so as to cool the inner surface 56 of outer flaps 40 and the outer surface 58 of the inner flaps 42. Still referring to FIG. 2, we see that afterburner duct 46 terminates in exhaust outlet 60 through which the gases from engine 10 are discharged after passing through afterburner 20. Afterburner duct 46 carries ring or attachment means 62 which permits inner flaps 42 to be pivotally attached to exhaust outlet 60. The plurality of inner flaps 42 are located circumferentially about and pivotally attached to exhaust outlet 60. Separating means 64 may be used to concentrically locate afterburner cooling liner 44 with respect to afterburner duct 46. Separating means 64 may consist either of a convoluted strip or a series of finger springs located circumferentially about afterburner duct 46 or may consist of a ring with a plurality of windows spaced circumferentially about the ring. Referring to FIG. 2 it will be seen that projection or conical support member 66 may extend outwardly from afterburner duct 46 to support it in nacelle 48. The plurality of outer flaps 40 may be overlapping and pivotally attach to projections 67 at pivot point 102. The plurality of outer flaps 40 are located circumferentially about outer duct or engine nacelle 48.

New referring to FIG. 2 we see that outer flaps 40 consist of inner wall 70 and outer wall 72 spaced therefrom and a smooth fairing 74 smoothly connecting the after ends of inner wall 70 and outer wall 72. While not necessarily so limited, smooth fairing 74 may be of substantially semi-circular cross section. Outer flaps 40 are elongated and outer wall 72 is elongated and substantially axially straight (FIG. 2). Inner wall 70 has forward section 71 which is substantially parallel to outer wall 70 and central section 73 which converges inwardly and diverges away from outer wall 70 at substantially the midlength of flap 40 and rear section 75 which diverges outwardly or converges toward outer wall 72 at its after or downstream end such that outer flaps 40 form the divergent section of a convergent-divergent type exhaust nozzle throughout the full variable nozzle area range since section 75 projects downstream of inner flaps 42. Inner flaps 42 are located roughly inboard of the convergent section 73 of outer flaps 40. It will be noted that connecting means or links 80 are pivotally attached to both outer flaps 40 at socket 81 and inner flaps 42 at hole 83 in web 85 (see FIG. 2) thereby connecting outer flaps 40 with inner flaps 42 such that the actuation of either plurality of flaps will actuate the outer plurality of flaps. FIG. 2 shows the plurality of inner flaps 42, which is relatively short with respect to outer flaps 40, and the plurality of outer flaps 40 in their extended position in solid lines and further shows both pluralities of flaps in their innermost position in phantom. It will be noted, as shown in FIG. 6, that outer flaps 40 may be used without inner flaps 42 by pivotally attaching the outer flaps 40''' to any duct such as nacelle 48 or afterburner duct 46. Of course, single outer flap 40''' (FIG. 6) may be in two parts as in FIG. 3.

The plurality of outer flaps 40 are either overlapping or connected circumferentially by outer flap interflap sealing means of the type described and claimed in co-pending application filed on even date by Robert E. Meyer and Hilmer K. Noren, entitled "Exhaust Nozzle," which permits relative circumferential movement between outer flaps 40 and provides an exhaust nozzle with smooth inner and outer walls which are smoothly connected at their after ends so as to wholly or partially form the divergent section of the exhaust nozzle. It will further be seen that inner flaps 42 have smooth inner surface 54 which is shaped convex inwardly when viewed from the centerline of exhaust nozzle 22 and powerplant 10 such that when in their extended position the plurality of inner flaps 42, which may either overlap each other or be joined by inner flap interflap sealing means of the type described and claimed in co-pending application filed on even date by Robert E. Meyer and Hilmer K. Noren, entitled "Exhaust Nozzle," form a smooth convergent-divergent nozzle which blends with the divergent exhaust nozzle formed by outer flaps 40. When in their inner position as shown in phantom in FIGS. 2 and 3, the plurality of inner flaps 42 form a convergent exhaust nozzle with outer flaps 40 so positioned with respect to inner flaps 42 that, in combination with fluid flow in annular passage 52, a divergent nozzle section is formed at all nozzle positions. Fluid flow in passage 52 which is exhausted through the annular orifice or cooling air nozzle 106 which is formed by the after end of inner flaps 42 and inner surface 56 of outer flaps 40 has the effect, in addition to the structure cooling effect previously mentioned, of aero-dynamically filling in the step between the inner flaps 42 and outer flaps 40 thus forming a smooth divergent shape flow path for the exhaust gases.

In the double flap configuration shown in FIG. 2 the outer flaps 40 only are caused to actuate and since they are connected by connecting means 80, the actuation of outer flaps 40 also actuates inner flaps 42. In the single flap configuration shown in FIG. 6 the same actuating means which is now to be described is used.

The phantom showing of flaps 40 and 42 in their inner or minimum area position in FIG. 2 shows that there are no abrupt changes in contour, mainly due to the length and smooth exterior convergence of outer flap 40 such that this double flap exhaust nozzle has good base drag characteristics. In addition to the smooth convergence of elongated outer flap 40 the smooth connection 74 between inner wall 70 and outer wall 72 of outer flap 40 further adds to the good base drag characteristics. In addition, as best shown in FIG. 3, actuating mechanism parts do not project from the nozzle surfaces. It will be noted that actuating cylinder and piston arrangement 100 is completely contained within the inner wall 70 and the outer wall 72 of outer flap 40. The submerged actuating system further adds to the good base drag characteristics of this exhaust nozzle.

FIG. 3 further demonstrates the flexibility which is added to the exhaust nozzle by having outer flap 40 made of forward outer flap unit 40' and after outer flap unit 40''. Unit 40' is pivotally attached to engine nacelle or other duct 48 at pivot point 102 while unit 40'' pivotally attaches to unit 40' at pivot point 104. As shown in FIG. 3, flap unit 40'' has angular variation α with respect to flap unit 40' thereby permitting close control of cooling air nozzle 106. It will be noted that cooling air passes through passage 50 and across the inner surface 54 of inner flap 42 and cooling air further passes through passage 52 and through area 108 between outer flap unit 40' and afterburner duct 46, from whence it is discharged through cooling air nozzle 106 into the main gas stream downstream of the primary nozzle throat and at such an angle that it will pass over the inner surface of inner wall 70 of outer flap unit 40''. The advantage gained by having cooling air nozzle 106 downstream of the primary nozzle throat is that the cooling air which passes through nozzle 106 is discharged into the main gas stream at a low pressure point with respect to the gas pressure at the primary nozzle throat. This facilitates cooling air introduction in that it does not have to be introduced to the main gas stream in an extremely high pressure area such that the cooling air would have to be at a higher pressure to be able to gain admission. Because after outer flap unit 40'' is pivotally attached to forward outer flap unit 40' and because one may be pivoted with respect to the other as described later, the area presented by cooling air nozzle 106 may be varied to a greater degree than if outer flap 40 was a one-piece unit. It will be noted that cooling air nozzle 106 gets progressively farther downstream of the primary nozzle throat as flap 40 and flap 42 move from their innermost to their outermost positions. Now referring to FIG. 4, we see in greater detail the actuating mechanism which causes outer flaps 40 to be actuated and, in turn, actuate inner flaps 42. FIG. 4 shows that actuating unit 100 consists basically of cylinder 110 which contains piston 112 and is attached to alternate outer flaps 40. Any fluid may be used to actuate piston 112 within cylinder 110. Piston 112 has rack 114 connected to it and projecting from its after end and through the after end of cylinder 110 to engage pinion 116. Piston 112 further has rack 118 attached to its forward end and extending forward through the forward end of cylinder 110 to engage pinion 120.

FIG. 4 shows a series of three adjacent overlapping outer flaps consisting of forward outer flap units 40'a, 40'b and 40'c, as well as the after outer flap units 40''a, 40''b and 40''c. Unit 40''a attaches to unit 40'a and so forth. It will be noted that flap units 40'a and 40'c overlap 40'b. Both the outer flaps 40 and the inner flaps 42 may be of the type and may utilize the interflap sealing means disclosed in co-pending U.S. application filed on even date by Robert E. Meyer and Hilmer K. Noren, entitled "Exhaust Nozzle." Rack 118 projects forward of cylinder 110 and causes forward flap unit 40' to pivot about pivot point 102 while rack 114 projects aft or downstream of cylinder 110 to actuate after outer flap units 40'' about pivot point 104 and forward flap units 40'.

The actuation of the forward flap unit by rack 118 will now be described and it should be borne in mind that rack 114 actuates the after outer flap units 40'' in the same fashion. Teeth 122 on rack 118 engage pinion 120 and cause it to rotate either clockwise or counter clockwise depending upon whether piston 112 is moving fore or aft within cylinder 110. FIG. 4 shows that an air or other fluid supply may be provided through duct 124 and admitted to rotary selector valve 126 which is actuated by pilot lever 128. When in the position shown, supply pressure will pass through line 124 and then through line 130 and into the after end of cylinder 110 to force piston 112 forward within cylinder 110. This will cause rack 118 to be moved forward and will cause pinion 120 to rotate counterclockwise. Rotary valve 126 may be rotated by pilot lever 128 so as to cause actuating fluid to pass through line 132 and thence into the forward end of cylinder 110 so as to force piston 112 rearwardly within cylinder 110 thereby moving rack 118 rearward or aft and causing pinion 120 to rotate clockwise. It will be noted that since racks 118 and 114 are both connected to single piston 112, both racks will be operated in the same direction at the same time and by selecting proper rack and pinion sizes and proper pitch to the threaded shafts 134 and 159 (to be described) variation in the angular displacement between forward flap unit 40' and after flap unit 40" may be accomplished and a schedule of nozzle divergent angle vs. nozzle diameter can be established. It will be apparent to those skilled in the art that flap units 40' and 40" could easily be caused to actuate independent of one another by merely placing a central lateral wall approximately midlength in cylinder 110 and having a piston on each side of this wall such that one piston is attached to rack 118 while the other is attached to rack 114. It will further be obvious that a single rack unit 118 may be used when outer flaps 40 are one piece as shown in FIGS. 1 and 6. A rotary selector valve unit 126 could then be used to actuate each of the pistons within cylinder 110. Returning to our description of the actuation of forward flap units 40', we note that pinion 120 is attached to threaded shaft 134. Threaded shaft 134 will have opposite threads in section 136 as compared to the threads in section 138. If the threads in sections 136 are righthand threads, the threads in section 138 are lefthand threads and that assumption will be made for the purpose of this description. Threaded shaft 136 will engage similarly threaded boss 140 which is pivotally attached to lug 142 about pivot shaft 144. Lug 142 is attached by any convenient attachment means such as welding to the undersurface of forward outer flap section 40'a. Opposite threaded shaft section 138 is engaged by similar threaded boss 146 which boss is pivotally attached to lug 148 through pivot shaft 150. Lug 148 is attached by any convenient method such as welding to the undersurface of alternate forward outer flap section 40'c. It will be noted that actuating cylinders 110 are attached to the intermediate remaining flaps or, as shown in the partial view of FIG. 4, to flap 40'b. Expressed in another way, actuating cylinders 110 attach to alternate flaps 40 while the jackscrews 135 and 135' which engages the rack units 114 and 118 attaches to adjacent flaps, that is, to flaps which are adjacent on each side of the flap 40 to which actuating unit or cylinder 110 attaches. To insure that all flaps actuate simultaneously, universal joint 152 is provided. Universal joint 152 is best shown in FIG. 5 in which threaded shaft 134 which engages boss 140, which boss is in turn pivotally attached to lug 142 which is, in turn, attached to the undersurface of flap 40'a, is shown to have innerdiameter splines 154 which engage with outerdiameter splines 156 of universal joint shaft 158. Universal joint 152 attaches universal shaft 158 which projects from the actuating cylinder 110 shown in FIG. 4 to universal shaft 158' which is splined to threaded shaft 138' which projects from the left adjacent cylinder 110 (not shown) with respect to cylinder unit 110 which is shown in FIG. 4.

As piston 112 causes rack 118 to move forward, pinion 120 is caused to rotate counterclockwise thereby causing lugs 142 and 148 to be drawn toward one another. Since lugs 142 and 148 are attached to forward outer flap units 40'a and 40'c respectively, which flap units overlap flap unit 40'b which is spaced therebetween, flap units 40'a and 40'c are drawn toward one another. Since lugs comparable to 148 and 142 are attached to flaps about the full periphery of exhaust nozzle 22, the action of the actuating unit 100 in drawing alternate flaps toward one another results in causing flap units 40' to pivot about point 102 inwardly so as to form an exhaust nozzle of smaller area. If piston 112 causes rack 118 to move rearwardly, the reverse action is brought about in that lugs 142 and 148 will be forced apart, thereby forcing the alternate flaps apart which will cause the exhaust nozzle 22 to move toward its open or maximum area position. In similar fashion, rack 114 through pinion 116 and oppositely threaded shaft portions 160 and 162 of shaft 159 causes lugs 164 and 166 on after outer flap units 40"a and 40"c to be moved toward or away from one another so as to either cause flap units 40" to form a nozzle of smaller or larger area.

Since lugs 140 and 142 as well as lugs 164 and 166 engage alternate flaps and since they are connected through shafts 134 and 159 and since corresponding lugs and shafts connect alternate flaps throughout the entire periphery of exhaust nozzle 22, the ring formed by the lugs and shafts serves to absorb the gas loading imposed by the gas which passes through exhaust nozzle and which bears against the undersurfaces 54 and 56 of flaps 42 and 40, respectively, in hoop tension. The actuating mechanism, therefore, serves as a structural member to strengthen the flaps of exhaust nozzle 22 and to assist them in retaining their selected position against the force of gas loading. The actuating mechanism 100 and the plurality of threaded shaft and lug units 142—134—148 and 164—159—166 are positioned at about the midlength of flaps 40.

The passing of cooling air over the surfaces of flaps 40 and 42 described supra, permits these metal flaps to better withstand the temperatures to which they are subjected in engine and afterburner operation. The hoop tension gas load adsorption of the nozzle actuating parts, described supra, serves to support the metal flaps and hold them in their selected positions thereby preventing the gas loading forces from being transmitted through the flaps to other engine and/or afterburner parts. The air cooling and hoop tension features individually and in combination serve to permit the use of a lighter weight nozzle since the flaps need not be made heavy to withstand thermal attack and large gas loading forces.

It will be observed that the actuating parts of flap portions 40' and 40" form a jackscrew 135. Forward-jackscrew is designated as 135 while after-jackscrew is designated as 135'. That is with respect to flap portions 40', pinion 120, opposite threaded shafts 136 and 138, bosses 140 and 146, and lugs 142 and 148 form a jackscrew, the opposite ends of which attach to alternate flaps 40'a and 40'c (FIG. 4) such that the rotation of pinion 120 in one direction causes the alternate flaps to move toward one another to close the exhaust nozzle, while the rotation of pinion 120 in the reverse or opposite direction will cause the alternate flaps to move apart to open the exhaust nozzle.

Now referring to FIG. 2 we see the double flap exhaust nozzle 22 in its outer position in solid lines, in its inner position in phantom. When in its inner position, the minimum nozzle throat area is presented as is the minimum divergent length and angle (all as shown) between inner flaps 42 and outer flaps 40. When flaps 42 and 40 are in their outer position, the maximum nozzle throat area and the maximum divergent angle and length between these flaps is presented. As exhaust nozzle 22 moves from its inner position to its outer position, the throat nozzle area will increase as will the divergent angle and the divergent length of the exhaust nozzle.

Exhaust nozzle 22 may be caused to assume any intermediate position between and including a full-open and full-closed by the use of any variable area exhaust nozzle control means such as the one disclosed and claimed in co-pending U.S. application Serial No. 503,133, entitled "Variable Area Nozzle Controls," and filed in the name of Robert E. Meyer and Edward F. Esmeier.

It will be noted that in its inner position, flaps 42 form a convergent exhaust nozzle, while in their outer position, flaps 42 form a convergent-divergent exhaust nozzle due to concave inner surface 54.

It is to be understood that the invention is not limited to the specific embodiment herein illustrated and described, but may be used in other ways without departure from its spirit as defined by the following claims.

I claim:

1. Three concentric ducts each having forward and after ends and forming passages therebetween through which cooling fluid may be passed in combination with an exhaust nozzle comprising a plurality of outer flaps pivotally attached to the outer duct after end and having an elongated and substantially straight outer wall and further having an inner wall spaced inwardly from said outer wall, said inner wall being substantially parallel to said outer wall at its forward end then diverging away from said outer wall at substantially its midlength section, then converging toward said outer wall at its after end, means to smoothly join said outer flap walls at their after ends, a plurality of relatively short inner flaps pivotally attached to the central duct after end and located inboard of said outer flaps approximately within said outer flaps midlength section such that the inner surface of said outer flaps and the outer surface of said inner flaps form a cooling air nozzle, said inner flaps having smooth inner surfaces which are shaped convex inwardly, means to connect said inner flaps to said outer flaps such that the actuation of one plurality of flaps will actuate the other plurality of flaps, said pluralities of outer and inner flaps being so positioned that a primary convergent-divergent exhaust nozzle of minimum throat area, minimum divergent length and minimum divergent angle is formed when said inner and outer flaps are in their innermost position and further such that the primary nozzle throat area, divergent length and divergent angle and the distance downstream of said cooling air nozzle from said primary nozzle throat increase progressively as said inner and outer flaps move from their innermost position to their outermost position.

2. An exhaust nozzle comprising a plurality of pivotable and overlapping outer flaps having an outer wall and an inner wall in spaced relation to said outer wall, a plurality of pivotable inner flaps located inboard of and attached to said outer flaps such that the actuation of said outer flaps actuates said inner flaps, actuating means comprising an actuating cylinder and piston unit attached to alternate outer flaps, a rack unit projecting from said piston and through said cylinder, a jackscrew engaging said rack and attaching to the adjacent outer flaps which are adjacent on each side of the outer flap to which said cylinder and piston unit is attached such that movement of said rack by said piston will cause said jackscrew to move said adjacent outer flaps toward or away from each other to close or open the exhaust nozzle.

3. An exhaust nozzle comprising a plurality of pivotable and overlapping flaps having an outer wall and an inner wall in spaced relation to said outer wall, said flaps comprising a forward flap unit and a separate after flap unit with said after flap unit pivotally attached to said forward flap unit, actuating means comprising an actuating cylinder and piston unit attached to alternate flaps, rack units projecting both forwardly and rearwardly from said piston and through said cylinder, a jackscrew engaging each of said rack units with the jackscrew attached to said forwardly projecting rack unit engaging adjacent forward flap units adjacent to the flap to which said actuating cylinder and piston unit is attached while the jackscrew attached to said rearwardly projecting rack unit engages adjacent after flap units adjacent the flap to which said actuating cylinder and piston unit is attached such that movement of said racks by said piston will cause said jackscrews to move said forward and after adjacent flap units toward or away from each other to close or open the exhaust nozzle.

4. An exhaust nozzle through which fluid may be passed comprising a plurality of pivotable outer flaps having a smooth and elongated outer wall and further having a smooth inner wall in spaced relation to and convergent to and smoothly joining said outer wall at their downstream ends to give good base drag characteristics, a plurality of relatively short pivotable inner flaps located inboard of said plurality of outer flaps and terminating a substantial distance upstream of said outer flap downstream ends and further having smooth inner surfaces which are shaped convex inwardly, means to connect said inner flaps to said outer flaps such that the actuation of said outer flaps actuates said inner flaps, actuating means completely contained between said outer flap walls to actuate said outer flaps causing said inner and outer flaps to coact to form a convergent-divergent exhaust nozzle of minimum throat area, minimum divergent angle and minimum divergent length and which nozzle presents smooth and regular surfaces to give good base drag characteristics when both pluralities of flaps are in their innermost position and a convergent-divergent exhaust nozzle of maximum throat area, maximum divergent angle and maximum divergent length and which nozzle also presents smooth and regular surfaces to give good base drag characteristics when both pluralities of flaps are in their outermost positions, and further such that a convergent-divergent exhaust nozzle with good base drag characteristics is formed at all times as said pluralities of flaps move from their innermost to their outermost positions while the nozzle throat area, divergent length and divergent angle increases.

References Cited in the file of this patent

UNITED STATES PATENTS

| | | |
|---|---|---|
| 2,625,008 | Crook | Jan. 13, 1953 |
| 2,639,578 | Pouchot | May 23, 1953 |
| 2,651,172 | Kennedy | Sept. 8, 1953 |
| 2,694,289 | Alford | Nov. 16, 1954 |
| 2,697,907 | Gaubatz | Dec. 28, 1954 |
| 2,778,190 | Bush | Jan. 22, 1957 |
| 2,796,731 | Morley et al. | June 25, 1957 |
| 2,797,548 | Marchal et al. | July 2, 1957 |
| 2,801,516 | Battle | Aug. 6, 1957 |
| 2,841,955 | McLafferty | July 8, 1958 |
| 2,870,600 | Brown | Jan. 27, 1959 |
| 2,880,575 | Scialla | Apr. 7, 1959 |
| 2,974,477 | Egbert et al. | Mar. 14, 1961 |
| 2,976,676 | Kress | Mar. 28, 1961 |

FOREIGN PATENTS

| | | |
|---|---|---|
| 165,224 | Australia | Sept. 15, 1955 |
| 1,097,287 | France | Feb. 16, 1955 |
| (Corresponding to Australian Patent 165,224) | | |
| 1,107,564 | France | Aug. 10, 1955 |